United States Patent [19]

Boehringer

[11] 4,360,239
[45] Nov. 23, 1982

[54] MANUAL/AUTO BRAKE VALVE

[75] Inventor: Wilfred E. Boehringer, Fullerton, Calif.

[73] Assignee: McDonnell Douglas Corporation, Long Beach, Calif.

[21] Appl. No.: 113,715

[22] Filed: Jan. 21, 1980

[51] Int. Cl.³ ............................................. B60T 11/12
[52] U.S. Cl. ................... 303/117; 244/111; 303/15; 303/50; 303/93
[58] Field of Search ............... 303/117, 118, 113, 119, 303/114, 93, 50–56, 61–63, 68–69, 13, 14, 15–17, 3, 92; 244/111; 137/625.4, 625.64, 625.69, 627.5, 110; 188/181 R, 181 A, 345, 106 F

[56] References Cited

U.S. PATENT DOCUMENTS

| | | | |
|---|---|---|---|
| 2,759,570 | 8/1956 | Shirey | 188/181 A |
| 2,826,278 | 3/1958 | Highley | 244/111 X |
| 3,265,447 | 8/1966 | Bueler | 303/52 |
| 3,279,867 | 10/1966 | Bueler | 303/52 |
| 3,486,801 | 12/1969 | Frayer | 303/117 |
| 3,492,053 | 1/1970 | Wallis | 303/52 X |
| 3,606,494 | 9/1971 | Frank et al. | 303/52 |
| 3,656,816 | 4/1972 | Schlitz et al. | 303/117 |
| 3,854,780 | 12/1974 | Boehringer | 137/110 X |
| 3,916,933 | 11/1975 | Boehringer et al. | 303/117 X |
| 3,923,346 | 12/1975 | Klimek et al. | 303/52 |
| 3,927,916 | 12/1975 | Masuda | 137/627.5 X |
| 4,116,492 | 9/1978 | Reinecke | 303/52 X |
| 4,120,540 | 10/1978 | Devlieg | 303/117 |

Primary Examiner—Douglas C. Butler
Attorney, Agent, or Firm—Paul T. Loef; George W. Finch; Donald L. Royer

[57] ABSTRACT

A manual/automatic brake valve of the OR configuration wherein either the servo command or the manual pedal force, whichever is the greatest, overpowers the other and is the exclusive controller of the brake pressure and springs are provided to generate a feel force during manual actuation. The feel force is independent of valve spool displacement as a result of the automatic servo input and as a result the feel force is relative to manual brake position and ignores brake force as a result of the servo command.

11 Claims, 8 Drawing Figures

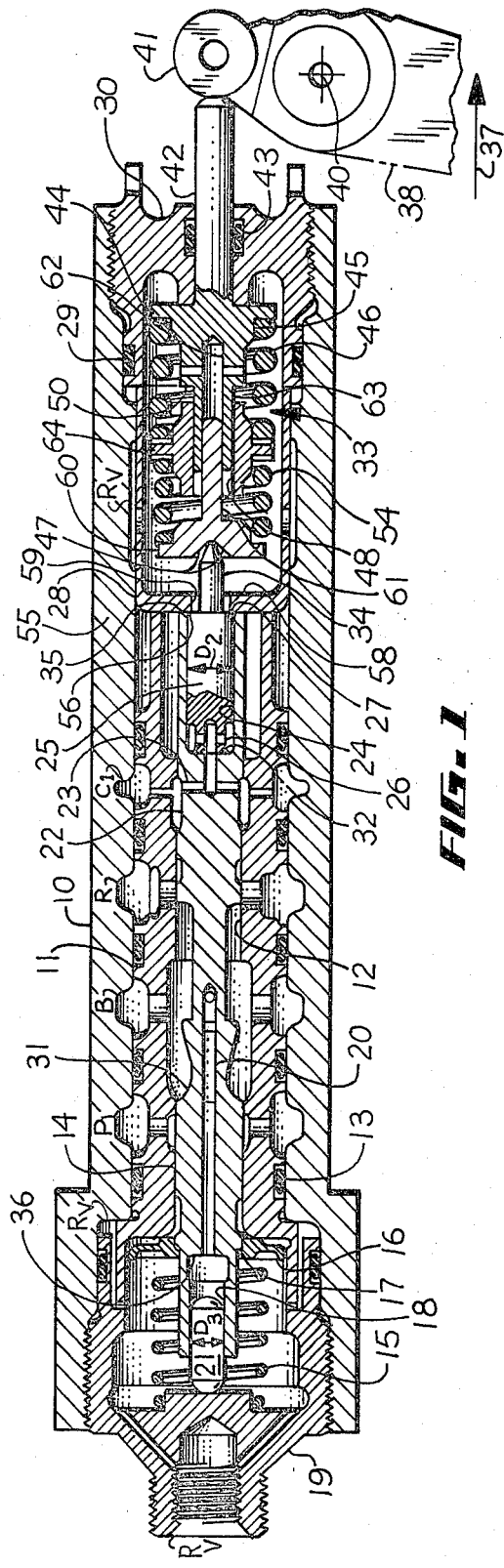

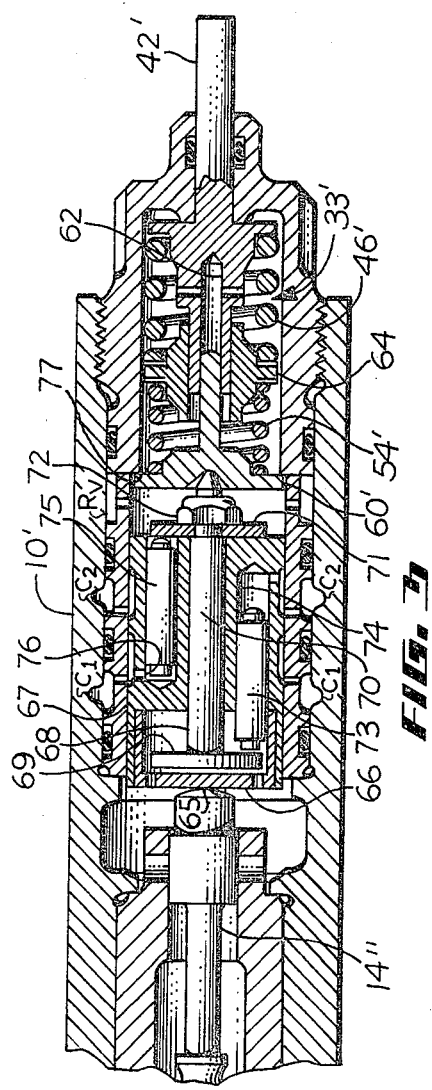
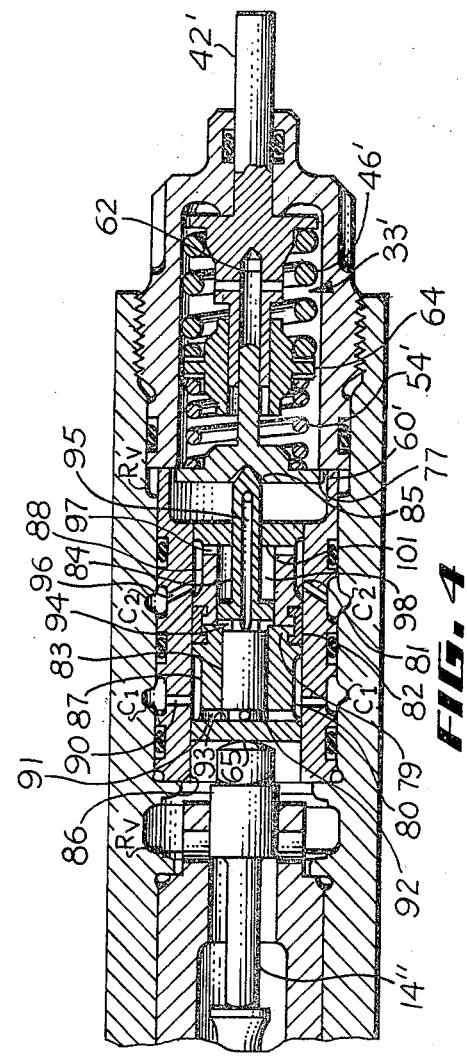

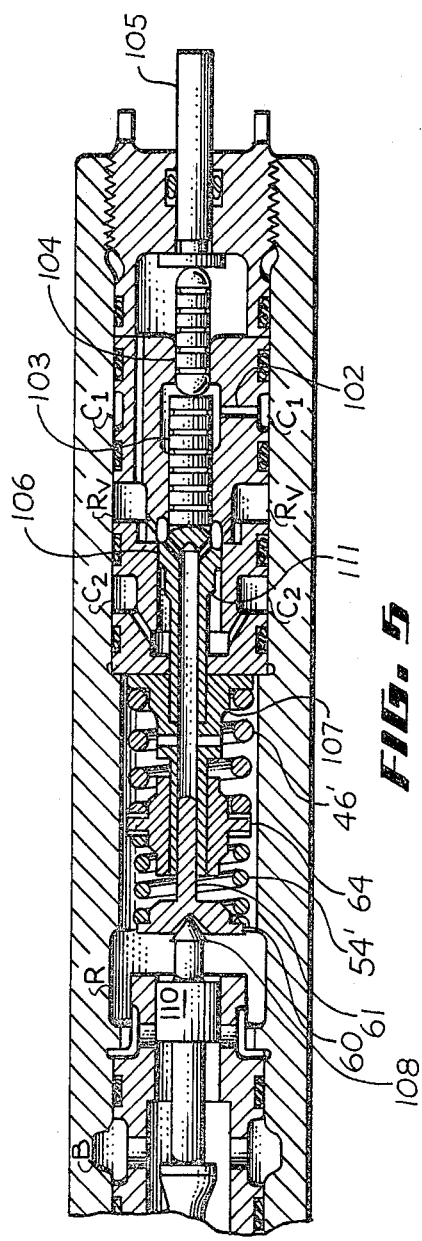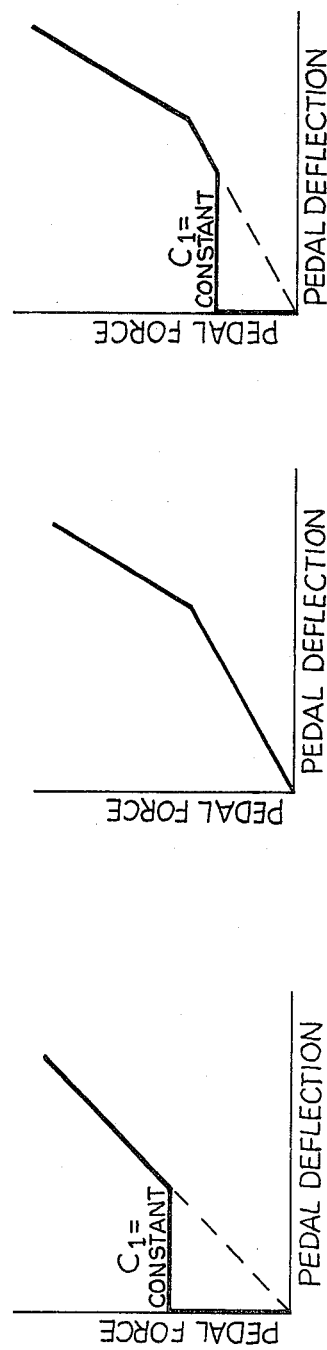

MANUAL/AUTO BRAKE VALVE

BACKGROUND OF THE INVENTION

This invention relates broadly to aircraft automatic braking systems and more particularly to servo valves for controlling automatic braking systems which are provided with a manual override capability.

Early commercial airplanes were provided with a pair of manually controlled brake systems, one pedal controlled the braking of the wheels on the left and one pedal controlled the braking of the wheels on the right side of the aircraft. Next, anti-skid systems were added to prevent locking and skidding of the wheels. Recently, automatic braking systems were added to automatically brake the aircraft on touchdown or in the case of a rejected takeoff in an effort to maintain a constant preselected level of deceleration during the arresting roll. Deceleration is accomplished by modulation of an electro hydraulic valve in response to a comparison of the preselected deceleration rate and the actual deceleration rate as may be determined by a linear accelerometer aboard the aircraft or by measuring wheel speed.

Manual override is considered a mandatory feature of any automatic aircraft braking system. The initial systems accomplished this feature by paralleling the manual brake valve with an automatic brake valve. Weight is reduced as well as complex plumbing circuitry when the manual valve and the automatic valve are integrated into one valve as taught in U.S. Pat. No. 4,120,540 issued to Devlieg.

Devlieg teaches three alternate embodiments of the brake valve which allow the automatic and pilot operated braking pressure commands to operate in an AND, OR, or AND/OR, fashion. In the OR mode whichever command, i.e. the pilots pedal pressure or the automatic brake pressure signal, dictates the highest brake pressure controls. In the AND mode the two commands are additive. In the AND/OR mode features of both of the prior embodiments are present. FIGS. 15, 17, and 19 of the reference plot brake pressure versus pedal force for the three alternate modes. Also shown is how the curves vary with different magnitudes of automatic brake command pressure. For the sake of simplicity in the analysis and discussion, a family of parallel lines is shown representing various magnitudes of pressure which are maintained constant. It is clear from the plots that when there is an automatic brake command signal and the pilot applies force to the brake pedal there is no increase in brake pressure until the pedal force exceeds the brake force generated by the automatic brake command signal. If you were to plot pedal force versus pedal travel for the valve of FIGS. 10-13 and ignored the force of the biasing springs 311 and 312, as suggested in the reference, the curves would look just like FIGS. 15, 17, and 19. In the case of the OR valve of FIG. 15, the pedal would not move until the force reached a magnitude equal to that represented by the automatic brake command signal at which time the pedal would deflect without any further force until it exceeded the force dictated by the command signal. In the AND valve configuration of FIG. 17, there is no pedal deflection until the pedal force again reaches a level equal to the pressure generated by the automatic brake command signal, at which time it follows the particular slope determined by the level of the automatic brake command signal. A plot of pedal force versus pedal displacement for this mode would indicate that the pilot would experience a free pedal until he picked up the load. The AND/OR valve of FIG. 19 avoids the free pedal problem associated with the AND valve in that there would be no pedal movement until the pedal force exceeded the force level of the automatic brake command signal at which time it follows one of the family of parallel slopes which depend on, again, the magnitude of the automatic brake command signal. Devlieg specifically teaches that the advantages of the AND/OR valve is to optimize the pilot's "feel" of the system. However, contrary to the assumption discussed earlier, the automatic brake command signal is not a constant, but is a function of the rate of deceleration of the aircraft and may very well be changing constantly which would constantly change the particular line in the family of lines being followed. At best, as taught in Devlieg, the pilot is experiencing either a constantly changing feel, a pedal which sees no deflection until a force equal to the command force is exerted on the pedal at which time the pedal deflection is very large without an increase in force, or a combination of the two.

It is an object of the present invention to provide an aircraft brake valve, featuring both an automatic control function and a manual control function integrated into a single metering valve.

It is a further object of this invention to provide a fail-safe system that always allows the manual control function to override the automatic control function.

It is another feature of the present invention to provide, in the nomenclature terms noted above, an OR valve in that either the automatic command or the manual command, whichever generates the highest pressure, overpowers the other to exclusively control the braking pressure.

A primary feature of this invention is to provide the pilot with a brake feel force in direct proportion to the manual brake command applied, which is always the same, even though there may be a concurrent automatic brake command.

SUMMARY OF THE INVENTION

In summary, the valve of this invention accomplishes the above objects and overcomes the disadvantages of the prior devices by providing a brake modulating valve responsive to a servo signal generated by the aircraft deceleration rate and having a plunger extending through the valve housing for manual actuation of the valve. The valve is styled as an OR valve in that either the servo command in the automatic mode or the manual force applied at the plunger, whichever is the highest, overpowers the other and is the exclusive controller of the brake pressure. Means for generating a feel force during manual actuation of the valve is provided between the plunger and the metering spool which is in direct proportion to the manual force applied at the plunger and is independent of the spool displacement as a result of the automatic servo input.

BRIEF DESCRIPTION OF THE DRAWING

With reference to the drawings, wherein like reference numerals designate like portions of the invention:

FIG. 1 is a sectional view of a manual/automatic brake modulating valve of the on/off, three-port type, servo valve having a single input and having a mechanical feel system in the manual operation mode;

FIG. 2 is a section view of a manual/automatic brake modulating valve of the four-port servo type having two inputs and a stepped spool along with a mechanical feel system which functions in the manual operation mode;

FIGS. 3 and 4 are partial views showing alternative embodiments of the dual servo valve input and the mechanical feel system for the valve shown in FIG. 2; and FIG. 5 is a sectional view of a manual/automatic brake modulating valve of the four-port servo type that functions in the AND mode with a different arrangement of the elements; and FIGS. 6-8 are typical plots of pedal deflection versus pedal force experienced during manual actuation of alternative brake valve configurations.

DESCRIPTION OF THE PREFERRED EMBODIMENTS

FIG. 1 shows an automatic brake modulating valve capable of being manually overriden of a type generally classified as a three port, on/off, servo valve having a single input. The valve housing 10, shown for clarity with the external ports and ducting to the valve ports omitted. Valve port identification is R for Return, Rv for Vent to Return, P for Supply Pressure, B for Brake and $C_1$ and $C_2$ (where applicable) for first and second servo command. Housing 10 is provided with a bore of several concentric diameters one of which accommodates the sleeve 11 which also has a through bore 12. The valve ports are isolated from each other by o-ring seals as at 13. Slidably engaging the bore 12 in the sleeve 11 is the valve spool 14. Biasing the valve spool 14 in the closed direction is a biasing spring 15 which engages a damping diaphragm 16 which mates against a shoulder 17 on the spool 14. The other end of the spring 15 is supported against the housing end 19. The same end of the valve spool 14 contains a partial bore 18 which communicates via the duct 20 to the brake port B via a reduced section in the spool at 31 and contains a feed back piston 21.

The servo command port $C_1$ has a matching relief at 22 in the valve spool 14 and sleeve 11 which communicates, via the duct 23, with another blind bore 24 in the opposite end of the valve spool 14. Bore 24 contains a servo piston 25, one end of which is shown ported and relieved at 26 simply to better distribute the command pressure $C_1$. The other end is stepped providing a shoulder at 27 and a reduced diameter portion 34 which protrudes beyond the end surface 35 of the bore 24. Spacer sleeve 28 has an end wall portion 58 and is provided with a centered aperture 59 through which the reduced diameter portion 34 protrudes. Travel of the servo piston 25 is restrained in one direction by the shoulder 27 of the servo piston 25 which bears against the end wall portion 58 of the spacer sleeve 28. Restraint in the opposite direction is provided by the surface 32 of the valve spool 14. The spacer sleeve 28 is retained in place in stacked relationship against the sleeve 11 by the end cap 30 which is sealed by the o-ring 29.

In the automatic brake mode, the servo valve functions in a typical fashion. A servo command signal is generated responsive to the difference between the preselected deceleration rate and the actual aircraft deceleration rate which amounts to a relative hydraulic pressure applied at the $C_1$ port. This relative servo command pressure applied at the $C_1$ port travels via the relief 22 and the duct 23 to act on the area projected by the bore 24 which has a diameter which will be identified as $D_2$ with the corresponding area identified as $A_2$. In the typical servo valve, this force would be reacted by the valve body rather than the servo piston 25, which will be discussed further infra. At any rate, the result is a force acting on the valve spool 14 to move it in the direction to open the valve and compress the biasing spring 15. The magnitude of the force being the servo command pressure times the area $A_2$. Movement of the spool 14 in this direction exposes the reduced section 31 to the supply pressure port P, which allows the supply pressure to reach the brake port B which is plumbed to the brake. At the same time, the spool closes the return port R. As previously indicated, the brake pressure is also ported to the bore 18 via the duct 20 to react against the feed-back piston 21 producing a force tending to move the valve spool 14 in the direction to close the valve. The restoring force has a magnitude equal to the brake pressure times the area of the feedback piston 21 which is indicated to have a diameter $D_3$ with a comparable area $A_3$. This force may be termed a feedback force. It should now be reasonably clear that the net command force is offset by the feedback force and the areas must be properly selected commensurate with the maximum supply and command pressures. In a typical system, the unmetered supply pressure may be 3000 psi, while the maximum command pressure is 1500 psi.

If the reduced diameter portion 34 of the servo piston 25 were omitted, the aperture 50 closed and the spring apparatus shown to the right of the end wall 58 of the spacer sleeve 28 in FIG. 1 ignored, the valve would function as a typical three port, single input servo valve. If means were provided to apply a manual force directly against the end surface 35 of the valve spool 14 through a hole in the end wall portion 58 of the spacer sleeve 28, the valve, although structurally substantially different, would function as taught in Devlieg. In the instant invention, the servo piston 25 is a lap fit in the bore 24 so both parts have similar diameters identified herein as $D_2$. Comparing to the Devlieg reference, the diameter of the servo piston 25 compares with $D_1$, $A_1$ of the reference, and the area of the end 32 of the bore 24 compares with $D_2$, $A_2$ of the Devlieg reference. Since the area of the servo piston 25 and the end 32 of bore 24 are essentially equal, as taught in the reference, the valve will function as an OR valve. In this configuration, the brake pressure B will be either as commanded by the first servo command pressure $C_1$ or the manual force applied against the servo piston 25 whichever is the greater force and the two forces will not be additive.

Now, if a servo command pressure is applied at $C_1$, the pressurized fluid travels down the duct 23 and applies pressure between the two opposing surfaces 32 and the end of the servo piston 25. The pressure causes the servo piston 25 to bottom against the end wall portion 58 of the spacer sleeve 28 and the spool 14 to move to the left in FIG. 1 or to open. Further, if means were provided, as discussed above, to apply a force directly on the servo piston 25, the piston would not move until the force exceeded the servo command pressure times the area of the surface 32. At this point, the servo piston 25 will move to the left until it bears against the surface 32 of the valve spool 14 without any increase in manual force. The brake pressure B remains the function of the servo command pressure at $C_1$ until the manual force exceeds the command pressure times the area of the surface 32, at which time the manual force takes over and determines the brake pressure B. A plot of the manual force applied at the servo piston 25, identified as pedal force, against the deflection or movement of the servo piston 25, identified as pedal deflection, is shown in FIG. 6. This curve indicates that the pilot experiences no pedal deflection until the pedal force equals the servo command pressure times the area of the surface 32, at which time no increase in force increases pedal deflection until the command pressure force is exceeded, at which time the pedal deflection responds linearly to pedal force. The point at which the pedal deflection responds linearly with pedal force is, of course, a function of the magnitude of the servo command pressure applied at $C_1$.

In order to give the pilot a more realistic feel when manually applying the brakes, the feel load mechanism 33 was added to the valve. Conversely to the discussion above, the servo piston 25 is complete including the reduced diameter portion 34 which protrudes through the aperture 59. Restraint is supplied by the shoulder 27 against the spacer sleeve 28. Hence in the automatic mode of operation, the valve behaves just as indicated above with the modified servo piston.

However, when there is a combination automatic brake force, i.e. there is a servo command pressure applied at the $C_1$ port, and a manual force applied to the feel load mechanism 33, the pedal reaction is totally different. Servo command pressure applied at $C_1$ travels down the duct 23, reacting between the end of the servo piston 25, which is pressed against the spacer sleeve 28, and the surface 32 of the valve spool 14. The reaction pushes the spool 14 in the direction to open the valve, leaving the space between the two surfaces filled with pressurized fluid. Of course, there is a restoring force as the brake pressure B is fed back to the duct 20 reacting between the ends of the feedback piston 21 and the wall 36 of the bore 18. The net result of the application of the servo command pressure at $C_1$ is displacement of the valve spool 14 to the left in FIG. 1 so that the end surface 35 of the spool 14 separates from the face of the end wall portion 58 of the spacer sleeve 28. The servo piston 25, however, forceably engages the surface of the end wall portion 58 at the shoulder 56.

Now should the pilot elect to increase the rate of deceleration of the airplane, force is applied to the brake pedal (not shown) which applies a force at the pedal end, generally indicated by the arrow at 37 of the brake valve crank 38 which is pivotally mounted at 40. Rotation of the brake crank about the pivot point 40 causes the follower 41, which is also pivotally mounted, to engage the plunger 42 which extends through the end cap 30, sealed by an O-ring 43. The plunger 42 is provided with a flange at 44, which works as a stop against the end cap 30 in one direction and supports a first spring on the opposite side of the flange. The plunger flange 44 then steps in diameter at 45 to guide the inside diameter of the first spring 46. Plunger 42 terminates in a cylindrical portion 63 which slidably engages a bore 48 in the shouldered spacer 64, which, in turn, supports the second spring 54 between the shoulder of the spacer 64 and the shoulder of the poppet 60. The poppet 60 is supported as the small diameter 61 slides in the mating bore 62 in the plunger 42. A depression 47 centered in the face of the poppet accommodates the end of the reduced diameter portion 34 of the servo piston 25. The stacked assembly from the flange on the poppet 60 to the flange 44 of the plunger 42 may be considered as the feel load mechanism 33.

Since we are in the automatic mode and there is already a servo command pressure at the $C_1$ port, the spool 14 is displaced in the direction to open the valve and the shoulder 27 of the servo piston 25 is reacting against the end wall portion 58 of the spacer sleeve 28. However, the spool end surface 35 is no longer in contact with the end wall portion 58 as the spool is slidably displaced. The application of brake pedal force by the pilot is applied to the brake link 38 and applies a force on the end of the plunger 42. Force against the end of the plunger 42 causes the two springs 46 and 54, arranged in series, to deflect since the servo piston 25 acts against the poppet 60 to resist the force. The two springs 46 and 54 will continue to compress until the force on the plunger 42 just exceeds the area of the end of the servo piston 25 times the command pressure at which time the servo piston 25 will translate until it bottoms against the surface 32 of the valve spool 14. Any increase in force on the end of the plunger 42 will now cause the valve spool 14 to move in the direction to further open the valve as well as further compress the springs 46 and 54 unless they have reached their stops.

In the preferred embodiment of FIG. 1, the two springs 46 and 54 have been chosen with different spring rates so that one spring reaches its stops substantially before the other so as to provide the knee in the curve of pedal force versus pedal deflection as shown in FIG. 7. By controlling the spring rates and the spring travel, the point at which the knee occurs can be controlled to provide superior brake pedal displacement versus feel characteristics. The feel of the brake increases in stiffness to the right of the knee in the curve. The stop for the spring 54, shown as the softer spring, is realized when the end of the shouldered spacer 64 contacts the bottom of the poppet 60. Obviously, in an alternative embodiment, the knee could be eliminated by removing the spacer 64 and employing a single spring in place of the two springs 46 and 54.

It should be noted that at the point when the manual force just exceeds the force generated by the servo command against the piston 25, translation of the servo piston 25 occurs without an increase in force on the plunger 42. However, displacement of the valve spool 14 is very small, approximately 0.020 inch, and consequently the displacement of the servo piston 25 is also very small while the displacement of the feel load mechanism 33 is, relatively very large. Basically, the stroke occurs in the compression of the springs 46 and 54 in the feel load mechanism 33 and not in displacement of the servo valve spool 14.

Manual operation of the brake valve without the prior application of a servo command signal follows identically to that above except there is no prior displacement of the valve spool 14. Hence there is no need for a translation of the servo piston 25 as the wall portion 58 of the sleeve 28 is in contact with the end surface 35 of the valve spool 14 at all times. Pedal force versus pedal deflection is exactly as shown in FIG. 7 and the same feel is experienced at the pedal by the pilot as in the case where a prior servo command signal is generated in the automatic mode.

FIGS. 2, 3, and 4 show a four-port valve having a stepped but balanced spool and two command inputs with a minor variation of the feel load mechanism 33 in FIGS. 3 and 4. The valve functions similarly to the three-port valve of FIG. 1, except that it has a second servo command input C₂, which drives the valve spool so as to close the valve on command and improve the valve response.

The four-port valve functions similarly to the three-port valve in that the servo command signal is applied at $C_1$, which acts against the end of the servo piston 25 to force the valve spool 14' in the direction to open the valve. Again the brake pressure is fed back through the duct 20 to the feedback piston 21 acting to close the valve. However, in the four-port valve, a second command signal is applied at port $C_2$, which reacts against the step 55 in the valve spool 14' so as to close the valve.

The feel load mechanism 33 will function identically as described above for FIG. 1 when the valve is manually actuated except that if there is a second servo command signal at $C_2$ manual displacement of the spool 14' would be further resisted by the second servo command pressure times the area of the stepped surface at 55.

FIG. 3 is an alternative embodiment of the four-port valve of FIG. 2 employing an alternative embodiment of the servo piston previously identified as 25 in FIGS. 1 and 2. The servo piston assembly is located between the valve spool 14'', slightly modified in the end portion from that of FIGS. 1 and 2, and the feel mechanism 33', essentially identical to that of FIGS. 1 and 2. The portion of the valve cut away in the view of FIG. 3 is identical to that of FIG. 2. The valve spool 14'' terminates in a spherical end at 65 which engages a cylindrical follower 66 which slidably nests in the inside diameter of the servo piston 67. Slidably contained in a central aperture in the servo piston 67 is the dual follower 68 having a rod 70 which terminates in a flange 69 on one end and a stepped diameter followed by a thread and terminating in a cone at the other end. The stepped diameter accepts a second flange 71 which is retained in place by a nut 72 to complete the dual follower 60. Between the central aperture and the outside diameter of the servo piston 67 are two sets of three pilot servo pistons 73 and 75 slidably contained in bores 74 and 76, respectively. When a first servo command pressure is applied at the $C_1$ port, the pilot pistons 75 extend to engage the flange portion 71 of the dual follower 68 which extends the servo piston 67 relative to both the dual follower 68 and the valve housing 10' moving the contained cylindrical follower 66, which engages the end 65 of the valve spool 14'', so as to open the valve. Similarly located, radially midway between the pilot pistons 75, is a second set of pilot pistons identified as 73, slidably engaged in their respective bores 74. These pistons extend to engage the second flange 69 (as shown) when a second servo command pressure is applied at the $C_2$ port causing the servo piston 67 to move in relation to both the dual follower 68 and the valve housing 10' which allows the valve spool 14'' to close. The cone end of the dual follower 68 always engages the poppet 60' which, in one direction, engages the shoulder at 77.

Although structurally somewhat different, the valve of FIG. 3 functions similarly to that described for FIG. 2. A first servo command pressure applied at the port $C_1$ communicates to the cylinder bores 76 causing the pilot pistons 75 to extend and engage the flange 71 of the dual follower 68. This action extends the servo piston 67 moving the cylindrical follower 66, displacing the end 65 of the valve spool 14'', causing the valve to open and the brakes to apply. If a second servo command pressure is applied at the $C_2$ port which exceeds the first command pressure or if the first command pressure attenuates, the $C_2$ pressure will communicate to the cylinder bores 74 extending the pilot pistons 73 against the flange 69 of the dual follower 68. The servo piston 67 moves to the right, as viewed, wherein the biasing spring 15' and/or the balance piston 21' (not shown in FIG. 3) will cause the valve spool 14'' to move in the direction to close the valve. In any case, the cone end of the dual follower 68 always maintains engagement with the poppet 60' so that when a manual force is applied at the end of the plunger 42' the valve behaves as indicated above for FIG. 2. The valve follows the pedal deflection versus force curve of FIG. 7 whether or not a first servo command signal exists at the time the manual force is applied.

It should be readily apparent that the embodiment of FIG. 3 is applicable to the valve of FIG. 1 by eliminating the second set of pilot pistons 73 connected to the second servo command signal at $C_2$. Again, the second servo command is employed simply to enhance the response characteristics of the brake valve in the direction to release the brake.

FIG. 4 is another alternative embodiment primarily of the mechanism identified in FIGS. 1 and 2 as the servo piston 25. The rest of the valve and the feel load mechanism 33' are essentially the same as in FIGS. 2 and 3. The servo piston assembly 78 consists of a first spool 80, a second spool 81, a keeper 82 to join the two spools together, and a first piston 83 and a second piston 84 slidably contained in the respective bores of the two spools 80 and 81. The second piston 84 terminates in a conical end at 85 which engages the poppet 60' of the feel load mechanism 33'. The entire servo piston assembly 78 is free to slide in the bore 86 and the reliefs 87 and 88 in the spools 80 and 81 are sufficiently large to insure that the reliefs communicate with the input port $C_1$ and $C_2$ throughout the full stroke. Pressure applied at the $C_1$ port communicates through the duct 90, the relief 87 and the duct 91 to pressurize the end 92 of the first piston 83. The pressure also reacts against the surface 93 of the first spool 80, causing the spool to exert force on the end 65' of the valve spool 14'' causing the valve spool to displace and thereby opening the brake port. The reaction against the end 92 of the first piston 83 is transmitted through the second piston 84 causing the conical end 85 to bear against the poppet 60' which, in turn, is supported against the shoulder 77. Leakage past the cylindrical surface of the piston 83 is vented by draining the cavity 94 via the duct 95 through the center of the second piston 84, which in turn vents to return at $R_v$. Obviously, as the pressure at $C_1$ increases the space between the surface 93 of the first spool 80 and the end 92 of the first piston 83 increases, further displacing the valve spool 14''.

Pressure applied at the servo command port $C_2$ travels via the duct 95, the relief 88, and the duct 97 into the cavity 98. Pressure at the cavity 98 extends the second piston 84 against the first piston 83, and since the pressure is also acting on the surface 101, the entire spool assembly 79 moves to the right, as shown, and the biasing spring 15' (not shown in FIG. 4) causes the spool 14'' to move to the right, closing the brake port.

Now, assuming a servo command signal at $C_1$ in the automatic mode, the pilot may override the automatic command signal by applying sufficient force at the external plunger 42'. As previously indicated, pressure at the command port $C_1$ displaces the spool assembly 79 to the left, increasing the gap between the surface 93 of the first spool 80 and end 92 of the first piston 83. Force at the plunger 42' will, of course, compress the springs 46' and 54', creating an instant feel to the pilot. However, the poppet 65 will not move until the force at the plunger 42' exceeds the force generated by the pressure against the area of the end 92 of the piston 83 at which time both the first piston 83 and the second piston 84 will be displaced to the left, as shown, until the end of the piston 83 contacts the surface 93 of the first spool. Any increase in the force will bear against the end 65' of the valve spool 14" causing the brake port to further open. Pedal force pedal deflection will again be as indicated in FIG. 7. Equal pressure at $C_1$ and $C_2$ which amounts to no command signal, or in the alternative, a command signal at $C_2$ will not have any effect on manual operation of the valve as force applied to the plunger 42 is transmitted through the springs 46' and 54' to the poppet 60' which in turn engages the second piston 84 which engages the first piston 83 pressing against the surface 93 of the first spool 80, moving the entire servo piston assembly 78 against the valve spool 14".

The final embodiment is shown at FIG. 5. This embodiment shows a valve that functions in the AND mode wherein the two commands, i.e. the pilots pedal pressure and the automatic brake pressure signal are additive. Furthermore, it shows an embodiment wherein the feel load mechanism 33' is located between the valve spool 14" and the servo command ports $C_1$ and $C_2$ so that when the valve functions either in the automatic mode or in the manual mode, it acts through the feel mechanism.

In the automatic mode, first servo command pressure is applied at the $C_1$ port and is communicated via the duct 102 to the end of the servo piston 103 and the end of the servo feel piston 104. The 104 piston is moved to engage the plunger 105 which is shouldered to form a stop. The pressure forces the piston 103 against the servo piston 106 which bears against the follower 107 compressing the springs 46' and 54' forcing the poppet 60 against the follower portion 108 of the valve spool 110. Displacement of the spool 110 acts to open the system pressure port to the valve brake port engaging the brakes. Although translation of the valve spool 110 is very small, the displacement of the springs 46' and 54' is comparatively large and there is a substantial gap created between the ends of the two pistons 103 and 104 by the servo command pressure. Now if manual pressure is applied at the brake pedal which applies the force on the end of the plunger 105 while the servo command signal exist at port $C_1$ in the automatic mode, plunger displacement will essentially follow the curve of FIG. 8. The difference between FIGS. 6 and 8 is the sloped part of the curve is stepped due to the different rates in the springs 46' and 54'. In other words, initial application of force at the plunger will not move the pedal until it reaches a force equal to the command signal pressure times the area of the piston 104 at which time the pedal will deflect with no increased force until it reaches the piston 103, at which time it will follow up the slope of the curve. Again, the brake force versus deflection will follow the dotted line portion of the curve during straight manual brake application. The case of the straight manual application with no automatic command, the entire force is applied at the end of the plunger 105 so the pilot will experience a different magnitude force at the pedal, with and without an automatic command signal when manually braking.

As in the embodiments shown in FIGS. 2, 3, and 4, if the second servo command signal at $C_2$ exceeds that at $C_1$ the $C_2$ pressure is applied against the area 111 of the feel piston 106. This pressure forces the piston 111 to move to the right, as shown, translating the pistons 103 and 104 and, again, as with the previous valves, the biasing spring 15 translates the spool 110 so as to close the brake valve.

While the preferred embodiments of this invention have been described above and shown in the accompanying drawings, it is to be understood that such embodiments are merely illustrative of, and not restrictive on, the broad invention, and it is not intended that the invention be limited to the specific arrangements, construction, or structures described or shown, for various modifications thereof may occur to persons having ordinary skill in the art.

What is claimed:

1. A manual/automatic brake modulating valve for an aircraft braking system having a hydraulic pressure source and a means for providing at least one servo command pressure responsive to an aircraft deceleration rate control signal, comprising:
    a housing having a bore, an input port connected to said hydraulic pressure source, at least one servo command port connected to said aircraft deceleration rate control signal and an output port connected to said aircraft braking system;
    a metering spool slideably contained in said bore in said housing and responsive to said aircraft deceleration rate control signal;
    a means for manual actuation of said metering spool;
    a means for generating a feel force during manual actuation of said valve; and
    at least one servo piston and cylinder arranged to act between said metering spool and said means for generating a feel force having a stroke at least as great as the stroke of said metering spool, oriented with said cylinder reacting against said metering spool and said piston reacting against said means for generating a feel force so that said feel force and said displacement of said means for manual actuation of said metering spool are essentially independent of spool displacement as a result of said servo pressure while said feel force is directly responsive to displacement of said means for manual actuation of said metering spool, whereby said output may be responsive exclusively to said servo command pressure or responsive exclusively to said manual actuation.

2. The manual/automatic brake modulating valve of claim 1 wherein said means for manual actuation of said metering spool is a plunger extending through said housing.

3. The manual/automatic brake modulating valve of claim 1 wherein said means for generating a feel force during manual actuation of said valve is at least one spring.

4. The manual/automatic brake modulating valve of claim 1 further comprising:
    means to conduct said servo command pressure to extend said at least one servo piston; and
    stop means to contain said at least one servo piston in said cylinder and to provide a positive stop for said metering spool and said servo piston in the direction that causes said valve to close.

5. The manual/automatic brake modulating valve of claim 4 wherein said at least one servo piston and cylinder is a single servo piston slideably contained in a bore in the end of said metering spool.

6. The manual/automatic brake modulating valve of claim 5 wherein:
- said servo piston, cylindrical in shape, has a stepped diameter with a generally flat surface between said stepped diameters, with the smaller diameter oriented to protrude from said bore in the end of said metering spool;
- a stop, fixed in said valve housing which engages said flat surface between said stepped diameters and having an aperture through which said smaller diameter protrudes; and
- a poppet having a head and a stem with said head engaging the end of said smaller diameter of said servo piston and said stem slideably engaging said plunger with at least one spring contained between said poppet and said plunger.

7. The manual/automatic brake modulating valve of claim 6 wherein said means for generating a feel force is two springs, having different spring rates, arranged in series with means to guide said springs located between said springs.

8. The manual/automatic brake modulating valve of claim 6 wherein said at least one servo command pressure is two servo command pressures, one to drive said metering spool in the direction to open said valve and a second servo command pressure to drive said metering spool in the direction to close said valve.

9. The manual/automatic brake modulating valve of claim 1 wherein said at least one servo piston and cylinder further comprises:
- a servo piston having a central through aperture with a counterbore at one end and a plurality of partial bores at the opposite end, equally spaced radially between said aperture and the outside diameter of said servo piston, said servo piston slideably contained in said bore in said valve housing, oriented with said counter bore facing the end of said metering spool;
- a cylindrical follower having an axial bore with a closed end slideably contained in said counterbore with said closed end oriented to engage said metering spool;
- a dual poppet, having a flange on either end with a stem therebetween which is longer than said through aperture in said servo piston, so as to determine the stroke of said servo piston, and said stem slideably engages said aperture with said flanges protruding on either end;
- pilot pistons slideably contained in said partial bores in said servo piston;
- means to conduct said servo command pressure to apply between the bottom of said partial bores and the end of said pilot pistons so as to extend said pilot pistons against one of said flanges; and
- guide means to provide a positive stop for said metering spool and said servo piston in the direction that causes said valve to close and is free to move in the direction that causes said valve to open.

10. The manual/automatic brake modulating valve of claim 9 further comprising;
- a second set of pilot pistons slideably contained in a second set of partial bores equally spaced radially and located in the bottom of said counterbore in said servo piston;
- a second servo command pressure; and
- a second means to conduct said second servo command pressure to apply between the bottom of said second set of partial bores and the ends of said second set of pilot pistons so as to extend said second set of pilot pistons against said flange on said dual poppet to move said servo piston in the direction away from said metering spool to allow said brake valve to close.

11. The manual/automatic brake modulating valve of claim 1 wherein said at least one servo command pressure is a first and a second servo command pressure and said at least one servo piston and cylinder further comprises:
- a servo piston, having a stepped bore, closed at the end of the smaller diameter and having an end wall with a reduced aperture at the other end wall with a reduced aperture at the other end, slideably contained in said housing bore with said closed end oriented toward said valve spool;
- a first piston slideably engaging said smaller diameter portion of said stepped bore in said servo piston;
- a second piston slideably engaging said larger diameter portion of said stepped bore in said servo piston and having a stem portion which slideably engages and protrudes from said reduced aperture in said end wall;
- first duct means to conduct said first servo command pressure to apply between the closed end of said servo piston stepped bore and said first piston;
- second duct means to conduct said second servo command pressure to apply between said end wall with said reduced aperture of said servo piston stepped bore and said second piston at said stem end;
- spring guide means axially located in said housing bore, bearing against said stem portion of said second piston.

* * * * *